US005904841A

United States Patent [19]

Penny

[11] Patent Number: 5,904,841

[45] Date of Patent: May 18, 1999

[54] FLUID CIRCULATION CENTRIFUGAL CLEANER WITH PRESSURE REGULATOR

[75] Inventor: Steven C. Penny, Yeovil, United Kingdom

[73] Assignee: The Glacier Metal Company Limited, United Kingdom

[21] Appl. No.: 08/860,275

[22] PCT Filed: Dec. 12, 1995

[86] PCT No.: PCT/GB95/02896

§ 371 Date: Jun. 17, 1997

§ 102(e) Date: Jun. 17, 1997

[87] PCT Pub. No.: WO96/21511

PCT Pub. Date: Jul. 18, 1996

[30] Foreign Application Priority Data

Jan. 12, 1995 [GB] United Kingdom .................. 9500571

[51] Int. Cl.[6] .......................... B01D 17/12; B01D 17/038

[52] U.S. Cl. ..................... 210/130; 123/196.5; 184/6.28; 210/120; 210/168; 210/416.5; 494/49; 417/151

[58] Field of Search .................................... 210/130, 133, 210/168, 171, 354, 360.1, 380.1, 512.1, 512.3, 90, 120, 257.1, 416.5; 494/1, 49; 184/6.21, 6.28; 417/151; 123/196 R, 196 S

[56] References Cited

U.S. PATENT DOCUMENTS

| | | | |
|---|---|---|---|
| 2,638,228 | 5/1953 | Downey et al. | 210/133 |
| 3,347,380 | 10/1967 | Alsobrooks | 210/130 |
| 3,432,091 | 3/1969 | Beazley | 494/49 |
| 4,046,315 | 9/1977 | Klingenberg et al. . | |
| 4,106,689 | 8/1978 | Kozulla . | |
| 4,885,082 | 12/1989 | Cantoni | 210/90 |
| 5,695,637 | 12/1997 | Jiang et al. | 210/416.5 |

FOREIGN PATENT DOCUMENTS

| | | |
|---|---|---|
| 1093617 | 11/1960 | Germany . |
| 1410981 | 1/1972 | United Kingdom . |
| 1520357 | 9/1976 | United Kingdom . |
| 1516568 | 10/1976 | United Kingdom . |
| 2046411 | 4/1979 | United Kingdom . |
| WO 83/02406 | 7/1983 | WIPO . |

OTHER PUBLICATIONS

Soviet Patent Abstracts Section Ch, Week 8905 Mar. 15, 1989 Derwent Publications Ltd., London, GB; Class J01, AN 89–037508 XP0020000735 & SU,A, 1 409 330 (AZOV–Black Sea AGRI), Jul. 15, 1988.

Soviet Patent Abstracts Section Ch, Week 8849 Jan. 25, 1989 Derwent Publications Ltd., london, GB; Class J01, AN 88–352156 XP0020000736 & SU,A, 1 398 915(AZOV–Black Sea AGRI), May 30, 1988.

*Primary Examiner*—Joseph W. Drodge
*Attorney, Agent, or Firm*—Nixon & Vanderhye P.C.

[57] ABSTRACT

A centrifugal fluid cleaning system includes a centrifugal cleaner through which a proportion of a circulated fluid is diverted, and a drainage assistance arrangement which includes a venturi arrangement through which non-diverted fluid is passed, the venturi developing locally a significant pressure drop in a region into which opens an induction port connected to the cleaner holding sump so that the cleaned fluid is entrained into the non-diverted fluid and returned to the circulation. While the pressure difference between inlet and induction ports is sufficient to drive the centrifugal cleaner rotor, the absolute pressures of the supply to, and drain from, the cleaner do not depend on the ambient atmospheric pressure and the overall pressure drop of the venturi arrangement is small, permitting it to be included within a closed circulation system. A pressure regulator permits bypass of the venturi arrangement to regulate the flow of fluid therethrough.

11 Claims, 2 Drawing Sheets

FLUID CIRCULATION CENTRIFUGAL CLEANER WITH PRESSURE REGULATOR

BACKGROUND AND SUMMARY OF THE INVENTION

This invention relates to fluid circulation systems including centrifugal cleaning devices and particularly relates to drainage of cleaned fluid from such devices.

Self-powered centrifugal fluid cleaning devices are well known for cleaning lubricating fluids of solid contaminants in engines and like mechanisms. Such centrifugal cleaning devices are described for example in U.S. Pat. Nos. 4,557,831 and 4,498,898, GB-A-2160796 and EP-A-0193020.

In particular, such devices are employed with fluids in the form of liquids, and in this specification the term fluid should be construed accordingly.

It will be appreciated that notwithstanding the simplicity and efficiency with which such devices separate solids from the fluid passing therethrough, there are a number of limitations attached to their usage which have hitherto served to limit their widespread use.

A typical form of such a self-powered centrifugal cleaner is shown in part sectional elevation at 10 in FIG. 1(*a*), comprising a base 11, rotor 12 mounted on a substantially vertical axis 13 for rotation thereabout, a housing 14 mounted on the base and enclosing the rotor and a drain or holding sump 15 formed in the base below the rotor. A fluid inlet passage 16 is arranged to supply fluid at elevated pressure to the interior of the rotor by way of the rotation axis and a fluid drain passage 17 in the base receives fluid from the drain sump for return to a fluid reservoir. The rotor has side walls arranged to retain solid contaminants, contained in the supplied fluid, which are forced outwardly by rapid rotation of the rotor due to reaction to ejection of the supplied fluid to the drain sump by way of rotor nozzles 18, 19 in the base thereof.

In respect of use of such a cleaner in a lubrication system for an engine or a fluid operated device, the quantity of fluid which can be passed through it in a given time is limited and the fluid emerging from the rotor nozzles 18 and 19 is in a low energy state and suited only for returning by gravity flow to a system reservoir or sump.

To this end it is usual to mount the cleaner above the level of the reservoir, and indeed other parts of the circulation system whereby the static head of the fluid in the holding sump provides adequate pressure for the fluid to drain, provided of course that the gaseous atmosphere of the cleaner housing (itself a prerequisite for rotor rotation) is not at a negative pressure with respect to ambient atmospheric pressure. Usually this is achieved by having a short downwardly directed drain duct of large cross-sectional area which provide also a vent by which the housing is exposed to ambient pressure.

It has been suggested, where such a dual purpose drainage duct is not practicable, that the housing be provided with a ventilation or breather valve, such as illustrated at 14', arranged to open when the housing atmospheric pressure becomes negative to a predetermined, but finite, extent, but to ensure that the holding sump drains until the valve does open it must be sited such that the static head provides an effective drainage pressure thus further constraining its freedom of usage.

It has also been proposed to avoid draining limitations consequent upon a sub-ambient housing atmosphere pressure by exposing the housing to an above-ambient pressure, possibly from an engine crank case, although this then requires either a corresponding increase in supply pressure to maintain the pressure drop across the rotor nozzles or acceptance of a reduced rotation efficiency, or by using a suction pump driven by way of a power take off from the engine or machine being lubricated by the circulated fluid. Notwithstanding the added complexity of providing such externally powered drainage facilities which detract from the self-powered nature of the cleaner, such systems have still functioned on the basis that the cleaned and ejected fluid, whose energy has been expended in driving the rotor, is returned to the reservoir at ambient atmospheric pressure from a housing whose atmosphere is not significantly different from such pressure.

It is also known to have a fluid driven centrifugal cleaner in which the separation rotor is driven by reaction to ejection of a fluid supplied thereto at substantially constant pressure solely for that purpose whilst a fluid of indeterminate, and possibly intermittent, supply pressure is passed through, and cleaned in, the separation rotor before ejection also to join the drive fluid in the holding sump. In this case all of the fluid ejected from the rotor, that is cleaned fluid and drive fluid, is at low pressure for return to the sump and by-passes any utilisation means of the circulation system. Such a centrifugal cleaner type is described in U.S. Pat. No. 3,791,576.

U.S. Pat. No. 4,1046,315 describes a self-powered centrifugal cleaner of lubricating oil of an engine which addresses the problem of removing oil from the cleaner housing, by gravity and the limitations that places on positioning the cleaner with respect to the sump, inter alia to prevent irreversible flooding of the cleaner housing by oil from the sump. The specification describes supplying excessive oil to the centrifugal cleaner so that the surplus by-passes the cleaner centrifuge and flows through a jet pump, that includes a venturi arrangement, disposed in communication with the housing so that the flow of oil therethrough entrains oil from the housing and prevents the centrifugal cleaner from becoming inoperative due to flooding of the housing. Notwithstanding the provision of a mechanism for emptying the housing of oil as a means for removing dependency or gravitational draining to the sump, to teaching remains one of the whole centrifugal cleaning arrangement being in a by-pas circuit which diverts some of the oil circulating in the engine lubrications system from the bearing surfaces etc. for centrifugal cleaning and drains it to the sump, from which it follows that if a surplus is required in the by-pass circuit to feed the jet pump in addition to the centrifuge, then either more oil is diverted from the main engine circulation or less diverted oil is passed through the centrifugal cleaner.

A similar configuration, in which a centrifugal cleaner housing is drained by a jet pump arrangement, is described in SU-A-1409330, wherein it is taught that the jet pump creates a negative pressure within the housing for increased rotation speed. The teaching of the various examples of centrifugal cleaning arrangements referred to above indicate a general acceptance within the art that such a centrifugal fluid cleaning device has to be operated in the so-called by-pass mode in which the fluid that is diverted to flow through the cleaning arrangement bypasses the main fluid circulation and the use to which it is put.

Although centrifugal cleaners as described hereinbefore are employed primarily to separate out contaminants from lubricating oil, these are equally valid in respect of cleaning other circulated liquids fluids in liquid powered systems.

It is an object of the present invention to provide, for a liquid circulation system, a centrifugal cleaning arrangement of simple construction which is free of many of the constraints of known arrangements and permits immediate use of the cleaned fluid in the circulation system. It is also an object of the present invention to provide a liquid circulation system including such centrifugal cleaning arrangement. It is yet a further object of the present invention to provide a closed circuit liquid circulation system including such centrifugal cleaning arrangement.

According to a first aspect of the present invention, a centrifugal liquid cleaning arrangement for circulated liquid comprises a centrifugal cleaner through which a proportion of the circulated liquid is diverted, the cleaner including a rotor spun by reaction to liquid ejected therefrom through rotor nozzles and a holding sump for ejected liquid from which it is drained, and cleaner drainage assistance means comprising a primary inlet port arranged to receive circulated liquid, a diversion port arranged to divert said proportion of the liquid from the inlet port to the cleaner, an outlet port to emit said liquid and, between the diversion and outlet ports, a liquid induction arrangement including an induction port operable connected to the holding sump of the cleaner to entrain liquid from the holding sump into the non-diverted liquid flow, the cleaner drainage assistance means being characterised by pressure regulator means comprising a bypass passage extending from upstream of said Liquid induction arrangement to downstream of the induction port and including a relief valve biased to close the passage and respond to a predetermined pressure difference between inlet and outlet ports to open the passage and permit liquid to by-pass the liquid induction arrangement.

According to a second aspect of the present invention a liquid circulation system includes a liquid reservoir, a liquid circulator and a liquid cleaning arrangement as defined in the preceding paragraph.

According to a third aspect of the present invention a closed circuit liquid circulation system comprises a fluid circulator, operable to cause the liquid to circulate through the system and a centrifugal liquid cleaning arrangement as defined in the last but one paragraph, arranged to divert a proportion of the circulated liquid to the centrifugal cleaner and provide therein cleaned liquid and pass non-diverted liquid through the cleaner drainage assistance means by way of a said liquid venturi arrangement thereof and induce cleaned liquid to be entrained into the non-diverted liquid flow.

Embodiments of the invention will now be described with reference to the accompanying drawings.

DETAILED DESCRIPTION OF THE DRAWINGS

Figure 1A:
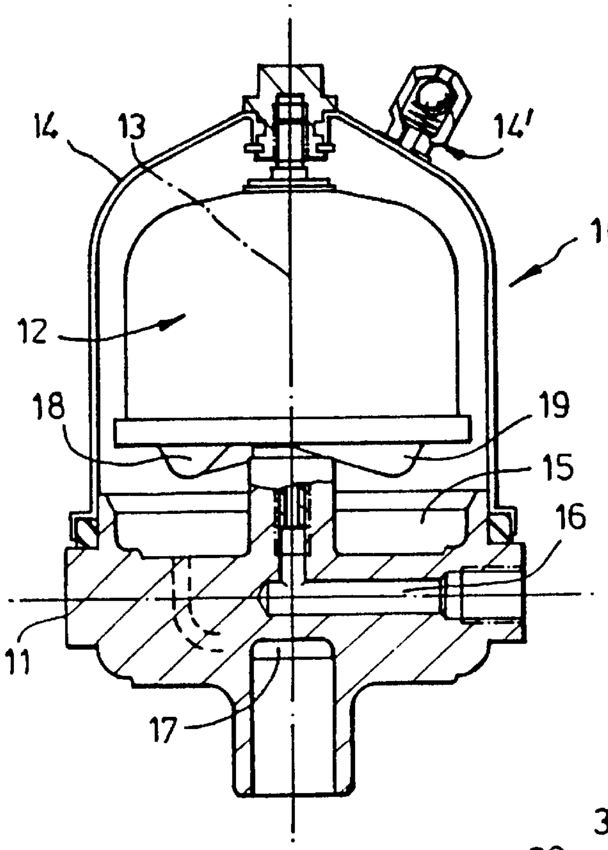
FIG.1(a) (PRIOR ART)
FIG. 1(*a*) is a partly sectional elevation of a self-powered centrifugal cleaner as described hereinbefore, FIG. 1(*b*) is a sectional elevation through a first form of drainage assistance means used with the centrifugal cleaner of FIG. 1(*a*) to provide a centrifugal drainage arrangement in accordance with the present invention, FIG. 1(*c*) is a schematic representation of a fluid circulation system incorporating the cleaner of FIG. 1(*a*) and drainage assistance means of FIG. 1(*b*), FIG. 2(*a*) is a sectional elevation through a second form of centrifugal cleaning arrangement in accordance with the present invention comprising a self-powered centrifugal fluid cleaner of similar form to that of FIG. 1(*a*) but incorporating a second form of drainage assistance means in the base thereof, FIG. 2(*b*) is a cross-sectional elevation through the base of the cleaner of FIG. 2(*a*) along the line X—X showing the drainage assistance means additionally including pressure regulation means, and FIG. 2(*c*) is a schematic representation of a closed fluid circulation system incorporating the cleaner of FIGS. 2(*a*) and 2(*b*)
Figure 1B:
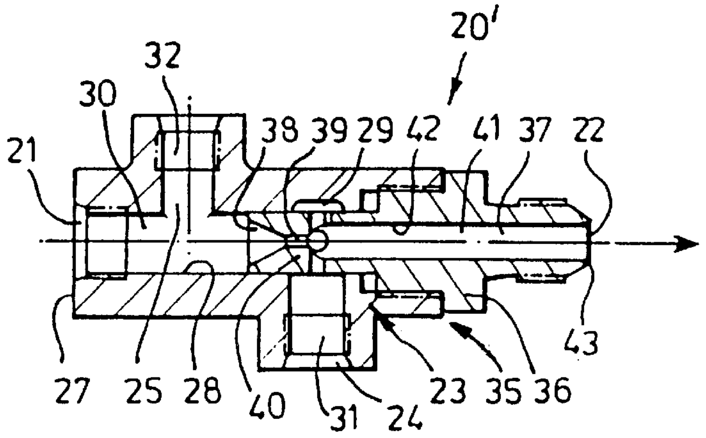
Figure 1C:
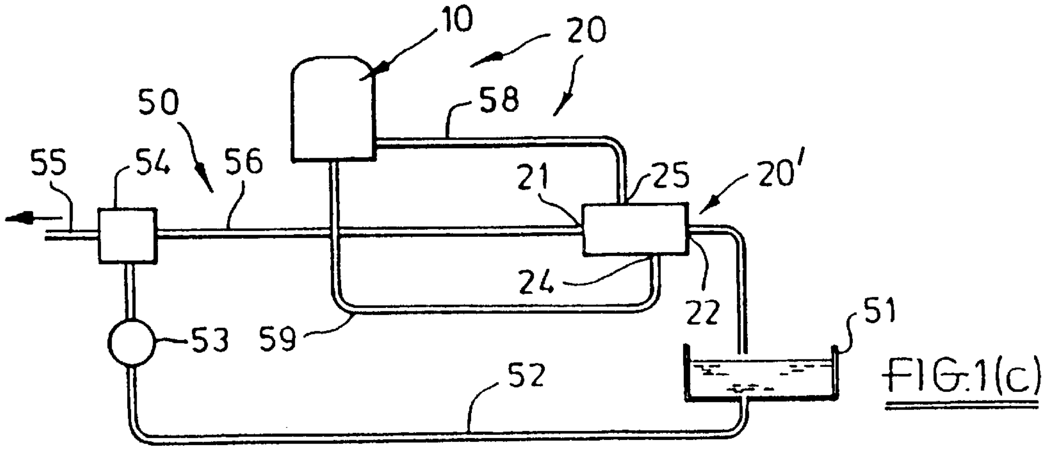

Referring to FIG. 1(*c*) a first form of centrifugal cleaning arrangement 20 comprises the above described centrifugal cleaner 10, which requires no further description, and cleaner drainage assistance means indicated at 20' and initially described in overview. The centrifugal cleaning arrangement 20 is used in conjunction in a fluid circulation system 50.

Referring to FIGS. 1(*a*) and 1(*b*) the cleaner drainage assistance means 20' comprises an input port 21 arranged to receive fluid being circulated in the circulation system 50 and an output port 22 to emit said fluid and, between the ports, a fluid induction arrangement 23 including an induction port 24 operably connected to the holding sump 15 of the cleaner 10 by way of drain passage 17. Between the inlet port and fluid induction arrangement 23 is a diversion port 25 by way of which some of the circulated fluid supplied to inlet port 21 is diverted to supply the cleaner by way of supply passage 16.

In operation the cleaner drainage assistance means 20' responds to the flow of non-diverted fluid through the flow induction arrangement 23 to induce cleaned fluid to be entrained into the non-diverted fluid flow.

Considering the drainage assistance means 20' in greater detail, it comprises a body 27 having a through-aperture 28 therein extending from the inlet port 21 at one end and in the region 29 the other end is of greater cross-sectional area and internally threaded. The aperture 28 defines a body passage 30. The body includes a blind aperture 31 defining an induction passage extending between the body passage and adapted for connection to the cleaner draining passage 17. The body also includes a blind aperture 32 which extends from the body passage 30, at the aforementioned diversion port, and is adapted to connection to the cleaner supply passage 16.

The flow induction means 23 comprises a venturi arrangement, indicated generally at 35, comprising a venturi body 36 containing a through-passage 37 and in the side wall thereof one or more transverse through-apertures 24' defining the induction port 24. The venturi body is disposed in the body passage 30 with the apertures 24' in fluid alignment with the induction passage 31 and is located and held by threaded engagement with the end region 29 of the body passage.

The venturi body through-passage 37 contracts to a neck of minimal cross-sectional area upstream of the induction port and downstream progressively increases in cross-sectional area. As shown, along a first part 38 of the through-passage 37 it contracts substantially uniformly as a function of distance to the neck portion 39 which is of substantially uniform cross-section extending along a second part 40, of the through-passage. Downstream of the neck 39, the through-passage increases in cross-sectional area rapidly in a first expansion region 41 which extends of substantially uniform cross-section along a third part 42 of the through-passage to the end 43 of the venturi body. The induction port 24, comprising aperture(s) 24', is disposed immediately downstream of the neck portion 39 where the passage opens to said first expansion region.

In use, when an outlet pipe is secured to the end 43 of the body and surrounding it, the increase in cross-sectional area defined thereby (or indeed if the body passage opens directly to the atmosphere) represents a second expansion region for the venturi arrangement that defines the outlet port 22.

The parts of the passage in the venturi body are dimensioned, having regard to a predetermined flow rate and pressure drop through the rotor jet nozzles required for rotation, such that the venturi arrangement can develop a pressure drop between the inlet port at least as great as that required for the rotor and the flow of non-diverted fluid can entrain fluid from the housing at a rate in excess of that at which diverted fluid is supplied to the rotor in the housing.

Considering the fluid circulation system 50 in greater detail, it comprises a fluid reservoir 51 which is open to atmospheric pressure, a feed pipe 52 extending from the reservoir and a circulating pump 53. The pump supplies fluid at elevated pressure to a junction 54, one branch 55 of which supplies the fluid to some utilisation means, and possibly by way of a full flow filter (not shown), whereas the other branch 56 supplies the fluid to the centrifugal cleaning arrangement 20, to inlet port 21 of the drainage assistance means 20'. A return pipe 57 extends between the outlet port at 22 to the reservoir 51. The cleaner drainage assistance means 20' is coupled to the self-powered centrifugal cleaner 10 of the arrangement by pipe 58, extending between the diversion passage 32 (diversion port 25) and the supply passage of the cleaner, and by pipe 59 extending between the induction passage 31 (induction port 24) and the drain passage 17 of the cleaner.

The centrifugal cleaner is shown disposed in accordance with conventional practice at the highest part of the circuit and assumed, prior to operation, to contain a gaseous atmosphere substantially at ambient atmospheric pressure.

In operation of the fluid circulation system, as fluid is pumped from the circulating pump 53 to the reservoir by way of the drainage assistance means 20, a proportion thereof is diverted to pass through the centrifugal cleaner; the non-diverted fluid passes through the venturi arrangement where it experiences a slight pressure drop between inlet and outlet ports before return to the reservoir. However, in passing through the neck 39 of the venturi device and then expanding into said first expansion region 41, a significant reduction in pressure occurs across the neck and fluid from the cleaner holding sump in drawn into the first expansion region and entrained in the fluid flow.

Because the cleaned fluid is entrained at a greater rate than it is supplied to the housing by way of the rotor nozzles, the holding sump is readily emptied by the venturi device and a proportion of the housing atmosphere may also be entrained (albeit inefficiently) until the atmospheric pressure within the housing stabilises substantially at the same pressure as the venturi induction port. Thus the pressure drop across the rotor nozzles becomes substantially equal to the pressure difference between the inlet and induction ports of the venturi device.

It will be appreciated that if the fluid contains a significant amount of dissolved gas which is liberated into the housing by the passage through the nozzles, such gas may tend to create a pressure rise in the housing atmosphere, as is experienced with known cleaners and a positive pressure difference with respect to the induction port.

As mentioned hereinbefore, proper operation of such a centrifugal cleaner is dependent upon pressure and flow rates within relatively narrowly defined limits; it is found for example that a pressure drop in the range 3.5 to 7 bars is typical for the rotor nozzle of such a cleaner to effect rotation at suitable speed. A drainage assistance device can readily be provided with a pressure difference between inlet and induction ports corresponding to this whilst exhibiting an overall pressure drop between inlet and outlet ports of less than 2 bars.

It will be seen therefore that such a drainage assistance means permits a centrifugal cleaner to be operated with a supply pressure as low as 2 bars when the outlet port is substantially at ambient atmospheric pressure or, for the centrifugal cleaner and drainage assistance means to be disposed at any part of a fluid circulation system in which an overall pressure drop of about 2 bars can be tolerated irrespective of the actual values of the inlet and outlet pressures with respect to ambient atmospheric pressure.

The centrifugal cleaner by virtue of the drainage assistance means is thus no longer constrained to disposition with respect to a particular supply pressure and drainage at reservoir pressure nor disposition above the reservoir to effect drainage by gravity.

The fluid circulation system 50 may therefore have the centrifugal cleaner mounted below the reservoir 51, provided the pressure at the output of the drainage assistance means 20' is sufficient to return the fluid to the reservoir.

It will be appreciated that in an arrangement wherein the centrifugal cleaner is operated below the level of the reservoir, when there is no circulation the housing may tend to fill with the fluid, compressing the gaseous atmosphere to a small pocket and from which pocket, over a period of time, gas may dissolve into the fluid. Upon commencement of circulation, the drainage assistance means drains fluid from the housing to the extent that the pressure of the atmosphere therein is not less than at the induction port. In practice this will result in simple passage of fluid, supplied by way of the nozzles, to the induction port without drainage of the excess fluid unless gas is added to the atmosphere to permit its displacement.

It is found within fluids which have gas dissolved therein that such gas separates upon passage through the rotor nozzles so that over a period of several minutes fluid circulation a gaseous atmosphere in the housing is restored to the extent that the fluid level falls below that required for the rotor to rotate and normal operation ensues.

If it is necessary for rotor rotation to commence immediately with fluid circulation, and/or it is not possible to rely upon gas dissolved in the fluid, a low atmospheric pressure in the housing at start up caused by the tendency for the venturi induction to create a vacuum in the housing in draining fluid may be relieved by providing a breather valve in the housing wall, similar to that shown at 14', or by providing a charge of gas from a source, possibly above ambient pressure and before circulation to displace the fluid even before operation of the drainage assistance means. It will be appreciated that whereas such atmosphere augmentation is able to provide operation as, or shortly after, circulation commences, if the gas is capable of dissolving in the fluid, a build up in the quantity of gas dissolved may occur if operation is stopped and started frequently. If the fluid does not dissolve gas then a single charge of gas may provide a sustainable atmosphere within the housing.

It will be understood from the above description that the supply pressure to the centrifugal cleaner that is, across the rotor nozzles is substantially equal to the pressure difference between the inlet and induction ports of the drainage assistance means, and thus dependent upon the rate at which fluid flows through the induction arrangement rather than actual value of the pressure at the inlet port, but that to maintain such supply pressure within a useful range it may be necessary to regulate the flow of fluid through the induction arrangement in accordance with such actual pressure and/or the position of the drainage assistance means in a fluid circulation system.

Figure 2A:
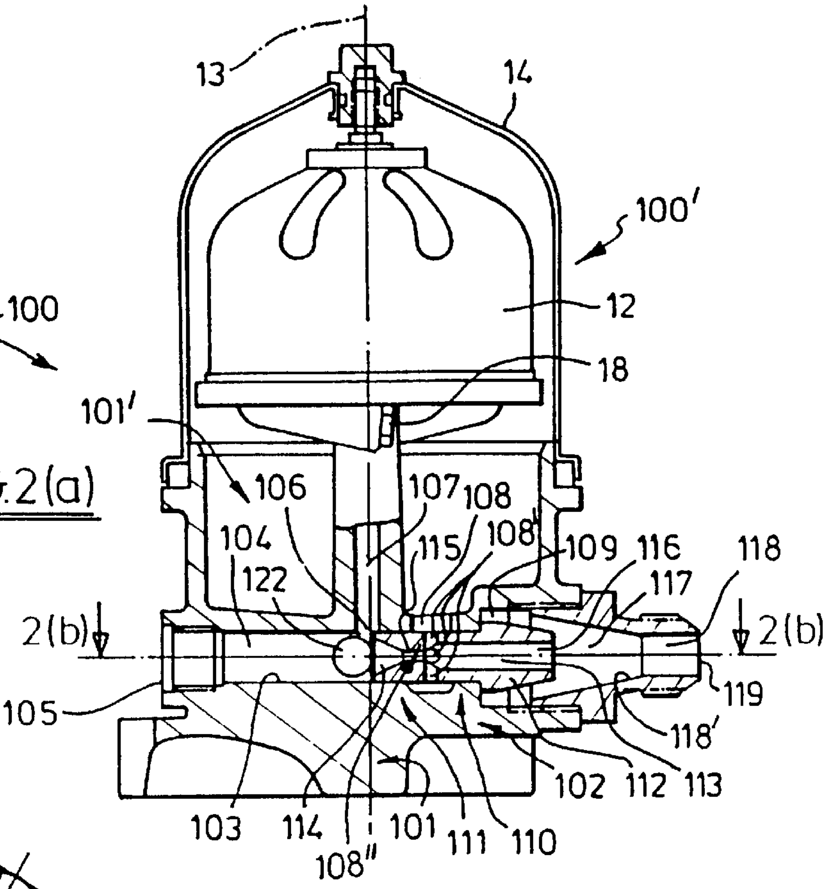
Figure 2B:
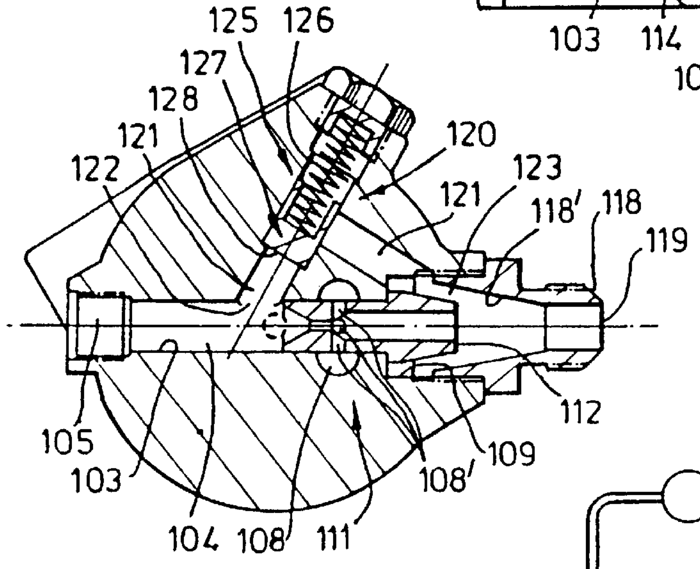
Figure 2C:
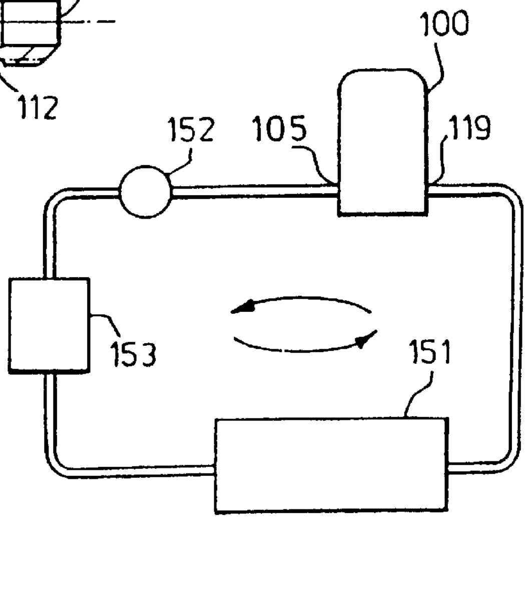

Whereas the centrifugal cleaning arrangement 20 described above employs a conventional centrifugal cleaner 10 and discrete cleaner drainage assistance means 20', the drainage assistance means may be integrated into the centrifugal cleaner, this and other variations included in a second embodiment being shown in FIGS. 2(*a*) to 2(*c*).

Referring to FIGS. 2(*a*) and 2(*b*), the centrifugal cleaning arrangement 100 comprises a self-powered centrifugal fluid cleaner 100' similar to cleaner 10 described above except that the base 101 in addition to defining a holding sump 101' for cleaned fluid also contains cleaner drainage assistance means 102. A through-aperture 103 defining a body passage 104 extends from inlet port 105 and includes a diversion port 106 communicating with passage 107 and a drainage passage 108 opening to the holding sump. The through-aperture 103 is of greater cross section, and internally threaded, at the other end 109.

The fluid induction arrangement, shown generally at 110 comprises a venturi arrangement 111 in the form of a venturi body 112 which is an interference fit in the narrower part of the through-aperture 103. In a similar manner to that described above in relation to venturi arrangement 35, the arrangement comprises a body 112 having a through passage 113 comprising a contracting first region 114, a neck region 115 and a first expansion region 116 at the junction of which, aligned with drainage passage 108, an array of transverse through-apertures 108' connect with passage 108 to define an induction port 108''. However the body 112 is somewhat shorter and terminates within the enlarged end region 109 of the through-aperture, which aperture region therefore comprises a second expansion region 117. A connector 118, which is adapted to connect to a pipe of the same, or preferably greater, cross-sectional dimensions as the input port, is screw threaded into said enlarged end of the body and defines outlet port 119; furthermore, the bore 118' of the connector 118, which defines the expansion region 117, is flared.

Additionally, pressure regulator means 120 is provided in the form of a by-pass passage 121 (defined by two intersecting cross drillings) extending from 122 upstream of the fluid induction arrangement 110 to downstream of the induction port, and indeed downstream of the whole venturi body 112, opening at 123 into the enlarged end region of the body through-aperture 109 so that fluid from both the venturi body and by-pass passage can be merged smoothly, assisted by the flared bore 118' of the connector 118.

The by-pass passage contains a relief valve 125 comprising spring 126 and valve body 127 arranged to seat against a shoulder 128 in the by-pass passage, the valve normally being biased closed to inhibit flow of fluid but to opened in response to a predetermined pressure difference between inlet and outlet ports 105 and 119.

It will be appreciated that operation is substantially the same as described hereinbefore for the discrete centrifugal cleaner 10 and cleaner drainage assistance means 20', with the exception that there is less flow resistance between the drainage assistance means and the cleaner, the regulator means 120 controls the pressure drop across the venturi device and thus the suction imparted thereby to the cleaner housing, and the second expansion region of the venturi is fully contained within the body and is effective irrespective of connection to a region of greater effective cross sectional area.

The cleaning arrangement 100, comprising centrifugal cleaner 100' incorporating this form of drainage assistance means may be employed in a fluid circulation system as described in FIG. 1(*c*) in which the cleaned fluid is returned to an open sump or reservoir that defines a pressure datum. Both forms, but particularly the cleaning arrangement 100, may be employed in a closed fluid circulation system shown schematically at 150 in FIG. 2(*c*). The system comprises a closed reservoir 151, such as an accumulator, a fluid circulator 152, fluid utilisation means 153, such as a fluid powered actuator or bearing set, and in series therewith the centrifugal fluid cleaning arrangement 100. As illustrated, the cleaning arrangement is disposed upstream of the circulator 152 to minimise any back pressure on the venturi that may compromise its efficiency.

It will be seen that all of the fluid circulated is passed through the drainage assistance means of the cleaning arrangement, there being only the aforementioned tolerable pressure drop across the venturi arrangement as a whole. A proportion only of the fluid passing through the arrangement at any one time is cleaned centrifugally the remainder by-passing the cleaner, but the cleaned fluid is returned to the circulated fluid without any diminution in circulated fluid volume and immediately circulated through the next component in the system.

Thus because the cleaned fluid is entrained directly into the circulating fluid that by-passes the cleaner and does not have to return by gravity to an open reservoir, the arrangement permits a self-powered centrifugal fluid cleaner to be employed in a closed fluid circulation system (which can accommodate the small pressure drop due to the venturi arrangement and cleaner) and to be positioned substantially anywhere in such a system that does not inhibit production of the venturi induction pressure.

It will be appreciated that although the above description has concentrated upon a self-powered centrifugal cleaner, a centrifugal cleaner (not shown) may be employed which is driven by circulated fluid that is simply ejected from rotor nozzles to effect rotation without being cleaned, whilst the rotor cleans and ejects fluid from a different part of the circulation system so that both fluid mix in a common holding sump. Such a cleaning arrangement functions substantially as described above except for an additional diversion of the drive fluid to the centrifugal cleaner.

It will be appreciated that many other modifications may be made, combining features of both embodiments of drainage assistance means, such as regulator means within the body 27 of means 20 or as a separate item coupled to the through-aperture in both embodiments.

It will also be appreciated that the venturi arrangement may take any other form that provides the desired function, such as comprising changes in cross sectional area which vary continuously with axial distance unlike the stepped regions described above. Likewise if stepped, the various regions may be of different axial length and/or different in number. Also, notwithstanding the form taken by the venturi through-passage, it and the regions may be defined by forming them integrally with the body as part of the wall of the through-aperture.

It will be appreciated also that the fluid induction means may be implemented by means other than a venturi arrangement, that causes an efficiently negative pressure with respect to the cleaner and the pressure drop already suffered by the cleaned fluid therein, relying for instance upon the jet effect of the circulating fluid by-passing the cleaner in passing the ends of suitably arrayed induction ports to entrain the cleaned fluid.

I claim:

1. A centrifugal liquid cleaning system for circulated liquid comprising a centrifugal cleaner through which a proportion of the circulated liquid is diverted, the cleaner including a rotor spun by reaction to liquid ejected therefrom through rotor nozzles, a holding sump for ejected liquid and from which said ejected liquid is drained, and a cleaner drainage assistance arrangement comprising a primary inlet port arranged to receive circulated liquid, a diversion port arranged to divert said proportion of the circulated liquid from the inlet port to the centrifugal cleaner, an outlet port to emit said circulated liquid, a liquid induction arrangement between the diversion and outlet ports, including an induction port operably connected to the holding sump of the centrifugal cleaner to entrain liquid from the holding sump into non-diverted circulated liquid flow, and a pressure regulator comprising a by-pass passage extending from upstream of said liquid induction arrangement to downstream of the induction port and including a relief valve biased to close the by-pass passage and respond to a predetermined pressure difference between said inlet and outlet ports to open the by-pass passage and permit liquid to by-pass the liquid induction arrangement.

2. A centrifugal liquid cleaning system as claimed in claim 1 in which the liquid induction arrangement comprises a venturi arrangement comprising a through passage extending in the direction of circulated liquid flow, having a first part, a second part downstream of the first part, a third part downstream of the second part, and between said second and third parts of the through passage said induction port, said first part contracting in said downstream direction substantially uniformly as a function of distance and defining a contracting region, said second part being of substantially uniform cross section defining a neck, said third part being of uniform cross section, greater than that of the neck, and defining a first expansion region, said through passage including, downstream of the first expansion region, a part of cross section greater than the first expansion region and defining a second expansion region.

3. A centrifugal liquid cleaning system as claimed in claim 2 in which the cleaner drainage assistance arrangement comprises a body having a through-aperture therein defining a body passage extending from said inlet port at one end and a blind induction aperture defining an induction passage extending between said through-aperture and connection with a cleaner drainage passage, and the venturi arrangement further comprising a venturi body containing said body passage and said induction port disposed within the blind induction aperture with said induction port in fluid alignment with the blind induction aperture.

4. An arrangement as claimed in claim 3 in which the by-pass passage and relief valve are contained in said body.

5. An arrangement as claimed in claim 3 in which the through-aperture is of increased cross-sectional area in an end region between a part thereof containing the venturi body and an end of the through-aperture and comprises said second expansion region of the venturi arrangement and the by-pass passage opens into said end region of the through-aperture.

6. An arrangement as claimed in claim 3 in which the body of the cleaner drainage assistance arrangement includes a blind diversion aperture extending from intersection with said through-aperture at a diversion port located between said inlet port and venturi arrangement to supply said diverted proportion of circulated fluid to the centrifugal cleaner.

7. An arrangement as claimed in claim 6 in which the centrifugal cleaner includes a base comprising the body of the drainage assistance arrangement and said diversion and induction apertures comprise supply and drain passages respectively of the cleaner.

8. A centrifugal liquid cleaning system as claimed in claim 7 in which the centrifugal cleaner is self-powered, and wherein said base of said centrifugal cleaner supports said rotor for rotation about a substantially vertically oriented axis and contains said holding sump below said rotor, including a housing mounted on the base and enclosing the rotor and holding sump, and to a source of gas operable to limit the level of pressure within the housing with respect to the pressure at the induction port.

9. An arrangement as claimed in claim 8 in which said source of gas is the atmosphere and including a breather valve in the housing and connected to the atmosphere to limit the level of pressure drop below atmospheric pressure in the housing.

10. A liquid circulation system including a liquid reservoir, a liquid circulator, and a liquid cleaning system as claimed in claim 1.

11. A closed circuit liquid circulation system comprising a liquid circulator, operable to cause the cleaning liquid to circulate through the system and a centrifugal liquid cleaning system as claimed in claim 1 arranged to divert a proportion of the circulated liquid to the centrifugal cleaner and provide therein cleaned liquid and pass non-diverted liquid through the cleaner drainage assistance arrangement by way of said liquid induction arrangement thereof and induce cleaned liquid to be entrained into the non-diverted liquid flow.

* * * * *